United States Patent
Kaigawa

(10) Patent No.: US 10,015,331 B2
(45) Date of Patent: *Jul. 3, 2018

(54) IMAGE FORMING APPARATUS, NON-TRANSITORY STORAGE MEDIUM STORING PROGRAM TO BE EXECUTED BY THE SAME, METHOD OF CONTROLLING THE SAME, AND TERMINAL DEVICE

(71) Applicant: BROTHER KOGYO KABUSHIKI KAISHA, Nagoya-shi, Aichi-ken (JP)

(72) Inventor: Shinsuke Kaigawa, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 77 days.

This patent is subject to a terminal disclaimer.

(21) Appl. No.: 15/299,045

(22) Filed: Oct. 20, 2016

(65) Prior Publication Data

US 2017/0041474 A1    Feb. 9, 2017

Related U.S. Application Data

(63) Continuation of application No. 13/727,091, filed on Dec. 26, 2012, now Pat. No. 9,477,336.

(30) Foreign Application Priority Data

Dec. 26, 2011 (JP) .................. 2011-284418

(51) Int. Cl.
*G06F 3/0485* (2013.01)
*H04N 1/00* (2006.01)
(Continued)

(52) U.S. Cl.
CPC ....... *H04N 1/00419* (2013.01); *G06F 3/0412* (2013.01); *G06F 3/0485* (2013.01);
(Continued)

(58) Field of Classification Search
CPC .......... H04N 1/00419; H04N 1/00474; H04N 1/00411
See application file for complete search history.

(56) References Cited

U.S. PATENT DOCUMENTS

| | | | |
|---|---|---|---|
| 2008/0222710 A1 | 9/2008 | Blagsvedt et al. | |
| 2009/0086269 A1 | 4/2009 | Nakajima | |

(Continued)

FOREIGN PATENT DOCUMENTS

| | | | |
|---|---|---|---|
| JP | 2007-148909 A | 6/2007 | |
| JP | 2009-086080 A | 4/2009 | |

(Continued)

OTHER PUBLICATIONS

Gazer, "iPhone 4S Super Manual", (first edition), Dec. 3, 2011, p. 46, ISBN: 978-4-7980-3155-2.

(Continued)

*Primary Examiner* — Lisa Landis
(74) *Attorney, Agent, or Firm* — Scully, Scott, Murphy & Presser, P.C.

(57) ABSTRACT

An image forming apparatus includes: a display; a first display controller configured to display a background screen image(s); and a second display controller configured to display, within each background screen image, at least one object image each for receiving a command for executing a corresponding predefined processing. The first display controller executes a display switch processing to switch the background screen image being displayed on the display from a first background screen image to a second background screen image by moving the first and second background screen images in a first direction. The second display controller executes a shaking display processing in which the object image displayed within the second background screen image is repeatedly moved between two positions. The shaking display processing is started upon a start of the (Continued)

display switch processing and finished after an end of the display switch processing.

15 Claims, 11 Drawing Sheets

(51) Int. Cl.
G06F 3/041 (2006.01)
G06F 3/0488 (2013.01)

(52) U.S. Cl.
CPC ....... *G06F 3/0488* (2013.01); *H04N 1/00392* (2013.01); *H04N 1/00411* (2013.01); *H04N 1/00474* (2013.01); H04N 2201/0094 (2013.01)

(56) References Cited

U.S. PATENT DOCUMENTS

| 2009/0144661 | A1 | 6/2009 | Nakajima et al. |
| 2011/0059775 | A1* | 3/2011 | Choi ............ G06F 1/1694 455/566 |
| 2011/0252372 | A1* | 10/2011 | Chaudhri ......... G06F 3/04817 715/835 |
| 2011/0320983 | A1 | 12/2011 | Chen et al. |
| 2012/0066591 | A1 | 3/2012 | Hackwell |
| 2012/0084691 | A1 | 4/2012 | Yun |

FOREIGN PATENT DOCUMENTS

| JP | 2009-088653 A | 4/2009 |
| JP | 2009-205675 A | 9/2009 |
| JP | 2011-159007 A | 8/2011 |
| JP | 2011-197248 A | 10/2011 |

OTHER PUBLICATIONS

Nozawa, N. et al., "iPad Perfect Manual for IOS 4", (first edition), Dec. 2010, p. 20, ISBN: 978-4-88166-775-0.
Notification of Reasons for Refusal dated Jan. 24, 2017 received in related JP 2016-090495 together with an English language translation.
Office Action dated Feb. 27, 2015 from related parent U.S. Appl. No. 13/727,091.
Office Action dated Aug. 27, 2015 from related parent U.S. Appl. No. 13/727,091.
Notice of Allowance dated Sep. 21, 2016 from related parent U.S. Appl. No. 13/727,091.

* cited by examiner

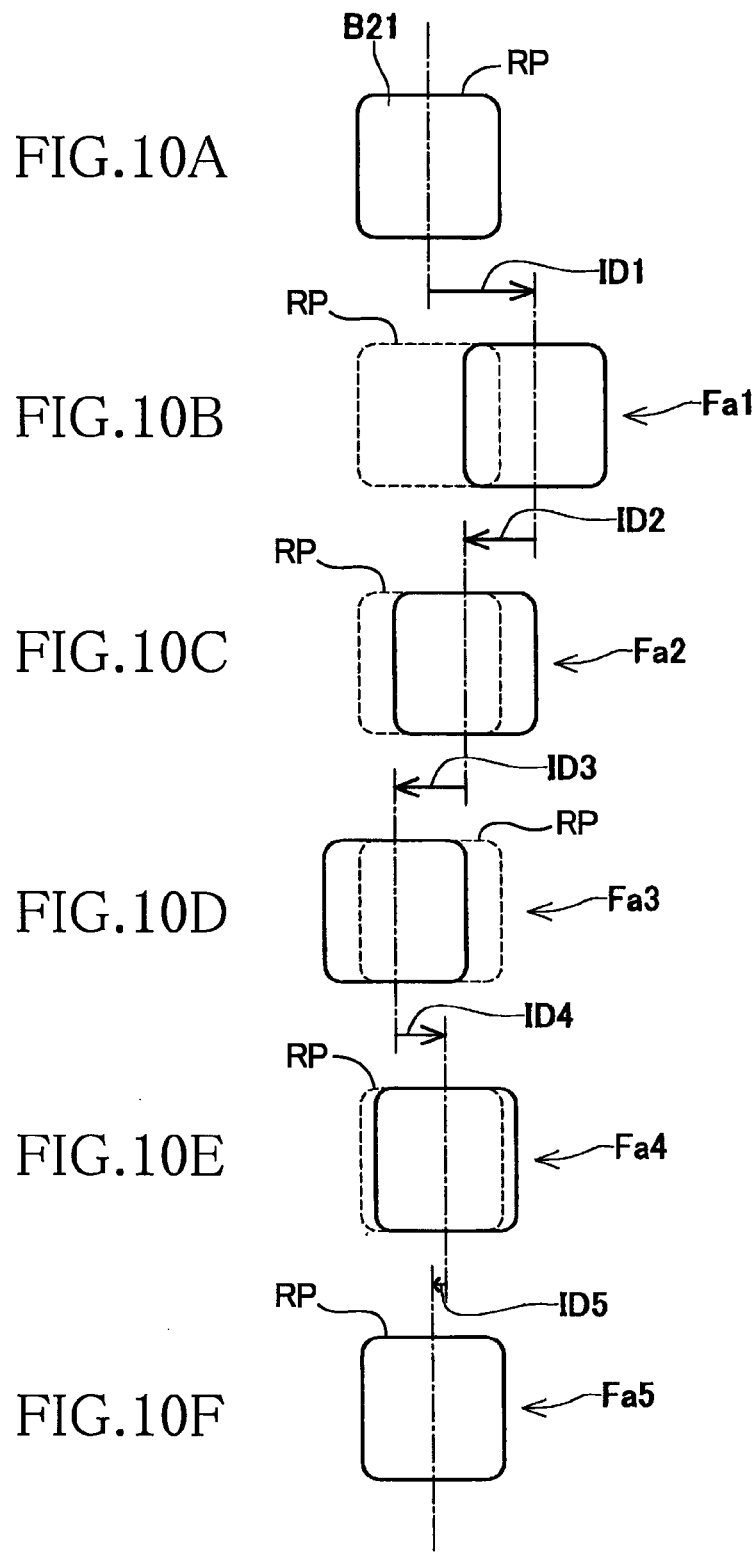

IMAGE FORMING APPARATUS, NON-TRANSITORY STORAGE MEDIUM STORING PROGRAM TO BE EXECUTED BY THE SAME, METHOD OF CONTROLLING THE SAME, AND TERMINAL DEVICE

CROSS REFERENCE TO RELATED APPLICATION

The present application is a continuation of and claims the benefit of pending U.S. application Ser. No. 13/727,091 filed on Dec. 26, 2012 which is based on Japanese Patent Application No. 2011-284418, filed on Dec. 26, 2011. The contents of each of the above documents are hereby incorporated by reference in their entirety.

BACKGROUND OF THE INVENTION

Field of the Invention

The present invention relates to an image forming apparatus configured to form various images, a non-transitory storage medium storing a program to be executed by a computer of the image forming apparatus, a method of controlling the image forming apparatus, and a terminal device.

Description of the Related Art

To display a lot of information on one display, there has been known a technique for displaying information by switching a plurality of screens. Displayed on each of the screens are various object images (e.g., icon images and button images) each of which receives a command for executing a corresponding processing. The screen to be displayed is switched in response to receipt of a switching operation. On the switched screen are displayed object images which are different from object images displayed on a screen before the switch. Also, there has been known the following technique for switching a plurality of screens to display information.

SUMMARY OF THE INVENTION

In addition to the object images, each of the screens may contain a plurality of indicating images for indicating various information such as a date and time image and an ink amount image. Each of the indicating images is an image not capable of receiving a command for executing a corresponding processing. In the case where the screen is switched and both of the object images and the indicating images are displayed on the screen after the switch, it is difficult for a user to identify which images are capable of receiving the commands, resulting in lower usability. This invention has been developed to provide a technique for enhancing the usability.

The present invention provides an image forming apparatus, comprising: a display configured to display at least one image thereon; a coordinate detector configured to detect an input coordinate which is a coordinate indicating a position of an input object having touched or approached a display region of the display; a first display controller configured to control the display to display one or ones of a plurality of background screen images and switch a background screen image being displayed on the display, from one to another of the plurality of background screen images; a second display controller configured to control the display to display, within each of the plurality of background screen images, at least one object image each for receiving a command for executing a corresponding predefined processing; and a processing executing unit configured, when the input coordinate detected by the coordinate detector is a coordinate corresponding to one of the at least one object image, to execute a processing that is assigned to the object image corresponding to the input coordinate detected by the coordinate detector, wherein the plurality of background screen images include: a first background screen image being displayed on the display; and a second background screen image that differs from the first background screen image, wherein the first display controller is configured to execute a display switch processing to switch the background screen image being displayed on the display from the first background screen image to the second background screen image by moving the first background screen image in a first direction such that the first background screen image gradually disappears from the display region of the display and by moving the second background screen image in the first direction such that the second background screen image gradually appears on the display region, and wherein the second display controller is configured to execute a shaking display processing in which the object image displayed within the second background screen image is repeatedly moved between a position located distant from a reference position in the first direction and a position distant from the reference position in a second direction that is opposite the first direction, the reference position being located within the second background screen image, the second display controller being configured to start the shaking display processing upon a start of the display switch processing by the first display controller and to finish the shaking display processing after an end of the display switch processing.

The present invention also provides a non-transitory storage medium storing a program to be executed by a computer of an image forming apparatus comprising: a display configured to display at least one image thereon; and a coordinate detector configured to detect an input coordinate which is a coordinate indicating a position of an input object having touched or approached a display region of the display, the program being designed to cause the computer to function as: a first display controller configured to control the display to display one or ones of a plurality of background screen images and switch a background screen image being displayed on the display, from one to another of the plurality of background screen images; a second display controller configured to control the display to display, within each of the plurality of background screen images, at least one object image each for receiving a command for executing a corresponding predefined processing; and a processing executing unit configured, when the input coordinate detected by the coordinate detector is a coordinate corresponding to one of the at least one object image, to execute a processing that is assigned to the object image corresponding to the input coordinate detected by the coordinate detector, wherein the plurality of background screen images include: a first background screen image being displayed on the display; and a second background screen image that differs from the first background screen image, wherein the first display controller is configured to execute a display switch processing to switch the background screen image being displayed on the display from the first background screen image to the second background screen image by moving the first background screen image in a first direction such that the first background screen image gradually disappears from the display region of the display and by moving the second background screen image in the first direction such that the second background screen image gradually appears on the display region, and wherein the second display controller is configured to execute a shaking display processing in which the object image displayed within the second background screen image is repeatedly moved between a position located distant from a reference position in the first direction and a position distant from the reference position in a second direction that is opposite the first direction, the reference position being located within the second background screen image, the second display controller being configured to start the shaking display processing upon a start of the display switch processing by the first display controller and to finish the shaking display processing after an end of the display switch processing.

The present invention also provides a method of controlling an image forming apparatus comprising: a display configured to display at least one image thereon; and a coordinate detector configured to detect an input coordinate which is a coordinate indicating a position of an input object having touched or approached a display region of the display, the method comprising: a first display controlling step of controlling the display to display one or ones of a plurality of background screen images and switch a background screen image being displayed on the display, from one to another of the plurality of background screen images; a second display controlling step of controlling the display to display, within each of the plurality of background screen images, at least one object image each for receiving a command for executing a corresponding predefined processing; and a processing executing step of, when the input coordinate detected by the coordinate detector is a coordinate corresponding to one of the at least one object image, executing a processing that is assigned to the object image corresponding to the input coordinate detected by the coordinate detector, wherein the plurality of background screen images include: a first background screen image being displayed on the display; and a second background screen image that differs from the first background screen image, wherein the first display controlling step comprises executing a display switch processing to switch the background screen image being displayed on the display from the first background screen image to the second background screen image by moving the first background screen image in a first direction such that the first background screen image gradually disappears from the display region of the display and by moving the second background screen image in the first direction such that the second background screen image gradually appears on the display region, and wherein the second display controlling step comprises executing a shaking display processing in which the object image displayed within the second background screen image is repeatedly moved between a position located distant from a reference position in the first direction and a position distant from the reference position in a second direction that is opposite the first direction, the reference position being located within the second background screen image, the second display controlling step comprising starting the shaking display processing upon a start of the display switch processing in the first display controlling step and to finish the shaking display processing after an end of the display switch processing.

The present invention also provides a terminal device, comprising: a display configured to display at least one image thereon; a coordinate detector configured to detect an input coordinate which is a coordinate indicating a position of an input object having touched or approached a display region of the display; a first display controller configured to control the display to display one or ones of a plurality of background screen images and switch a background screen image being displayed on the display, from one to another of the plurality of background screen images; a second display controller configured to control the display to display, within each of the plurality of background screen images, at least one object image each for receiving a command for executing a corresponding predefined processing; and a processing executing unit configured, when the input coordinate detected by the coordinate detector is a coordinate corresponding to one of the at least one object image, to execute a processing that is assigned to the object image corresponding to the input coordinate detected by the coordinate detector, wherein the plurality of background screen images include: a first background screen image being displayed on the display; and a second background screen image that differs from the first background screen image, wherein the first display controller is configured to execute a display switch processing to switch the background screen image being displayed on the display from the first background screen image to the second background screen image by moving the first background screen image in a first direction such that the first background screen image gradually disappears from the display region of the display and by moving the second background screen image in the first direction such that the second background screen image gradually appears on the display region, and wherein the second display controller is configured to execute a shaking display processing in which the object image displayed within the second background screen image is repeatedly moved between a position located distant from a reference position in the first direction and a position distant from the reference position in a second direction that is opposite the first direction, the reference position being located within the second background screen image, the second display controller being configured to start the shaking display processing upon a start of the display switch processing by the first display controller and to finish the shaking display processing after an end of the display switch processing.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 10A-10F are views generally showing an icon animation processing;

DETAILED DESCRIPTION OF THE EMBODIMENT

Embodiment

Figure 1:
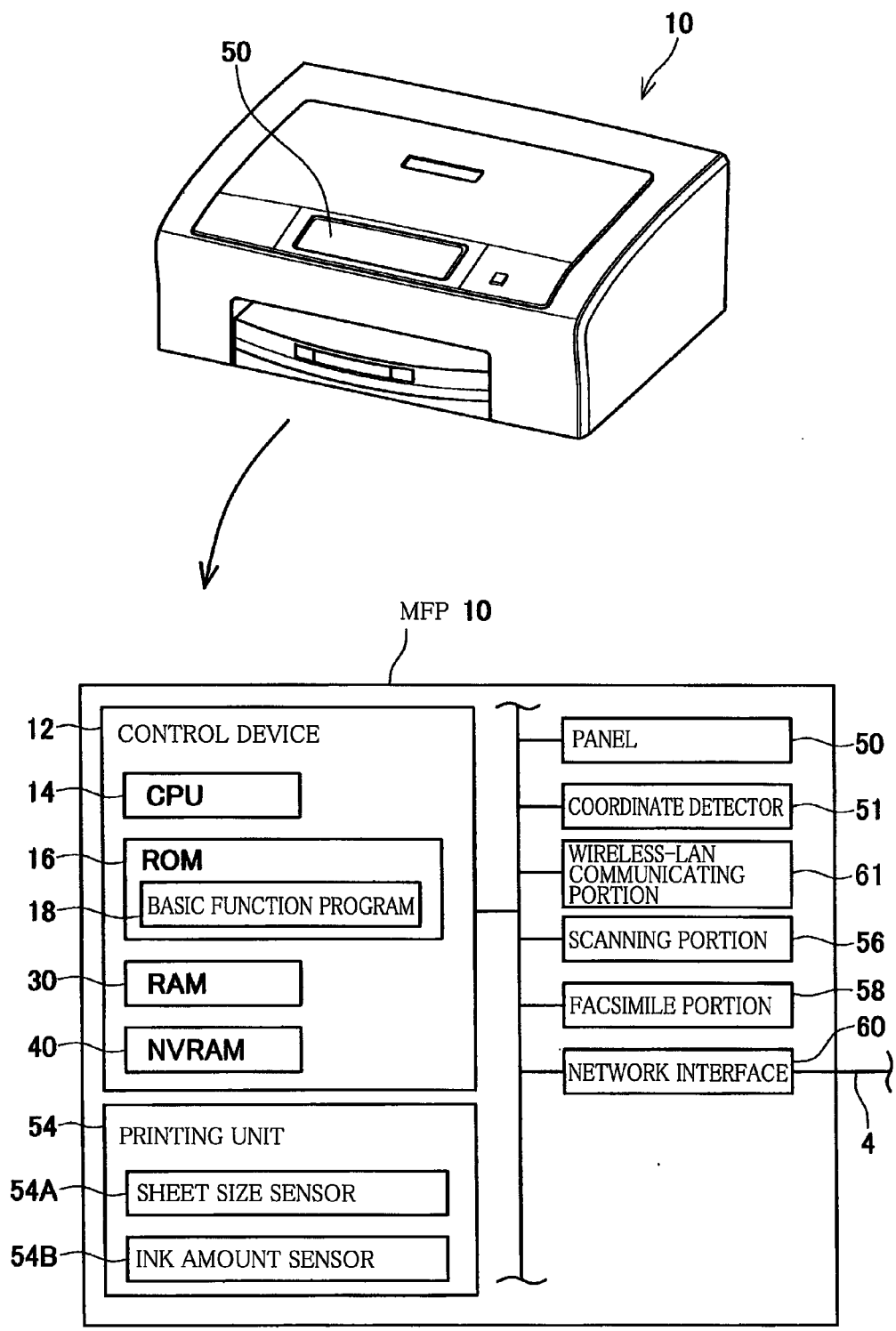
FIG. 1 is a perspective view showing an MFP and a block diagram showing an internal construction of the MFP.
Figure 2:
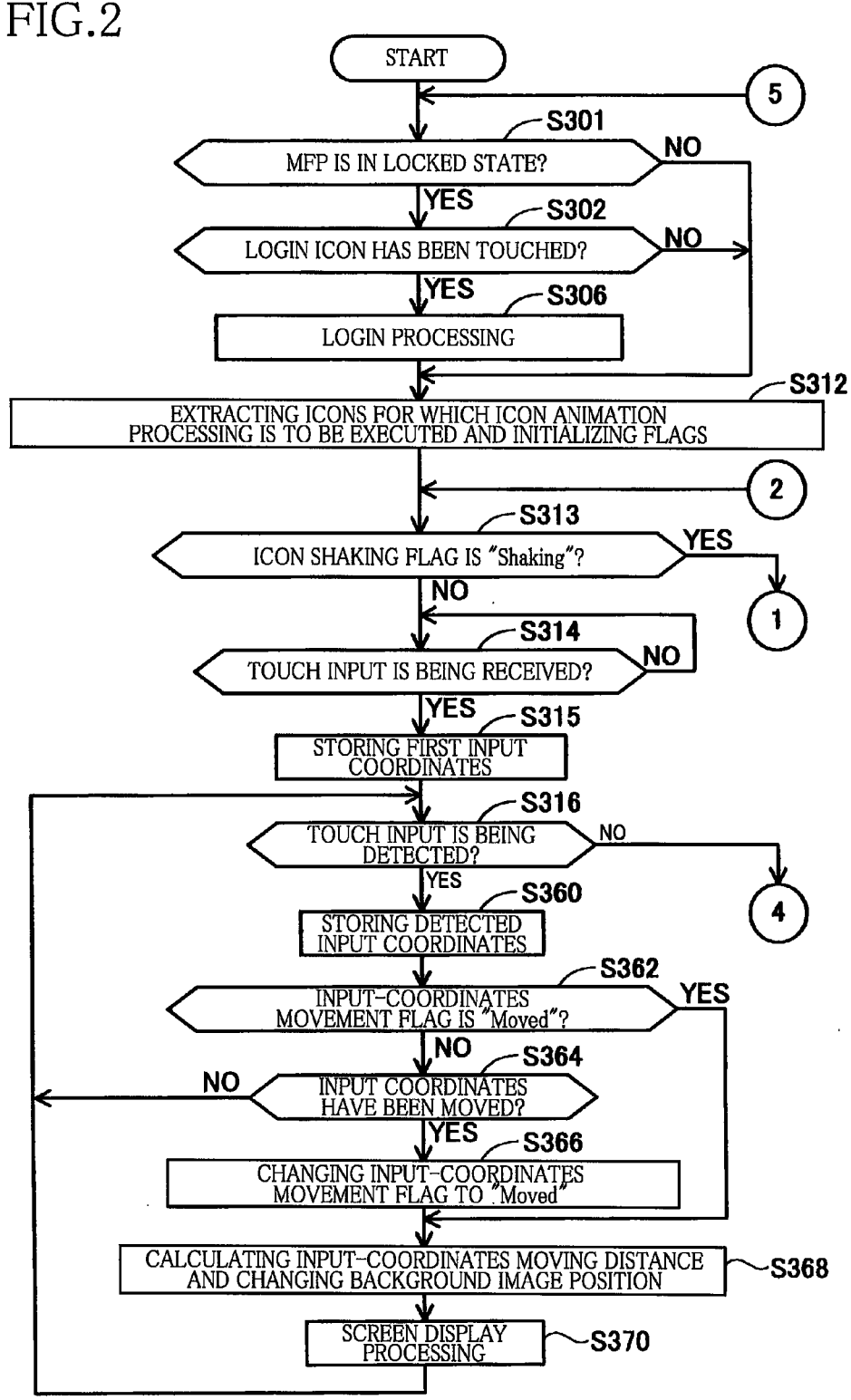
FIG. 2 is a flow chart showing operations of the MFP.
Figure 3:
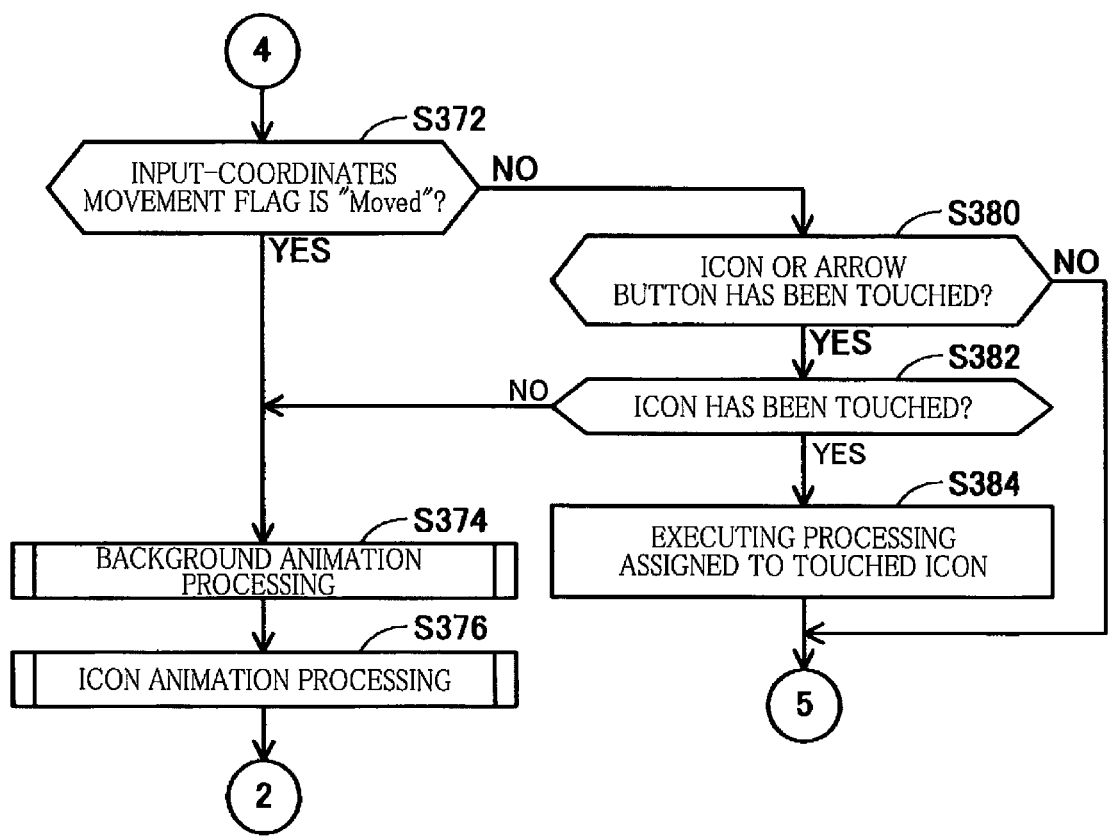
FIG. 3 is another flow chart showing operations of the MFP.

Hereinafter, there will be explained a multi-function peripheral (MFP) 10 according to one embodiment of the present invention by reference to the drawings.

Construction of MFP 10

The MFP 10 has various functions such as a printing function, a scanning function, a copying function, a facsimile function, and a telephone function. The MFP 10 includes a control device 12, a panel 50, a coordinate detector 51, a printing unit 54, a scanning portion 56, a facsimile portion 58, a network interface 60, and a wireless-LAN communicating portion 61. The control device 12 includes a CPU 14, a ROM 16, a RAM 30, and a non-volatile RAM (NVRAM) 40.

The CPU 14 executes various processings according to programs stored in the ROM 16. The processings to be executed by the CPU 14 will be explained later in detail. The ROM 16 stores a basic function program 18 for controlling basic operations of the MFP 10.

As shown in FIG. 1, the panel 50 is provided on a front portion of an upper face of the MFP 10. The panel 50 is designed to display various images and its surface is covered with the coordinate detector 51 having a transparent flat portion. The coordinate detector 51 detects touch or approach of an input object (such as a user's finger or a stylus) on or toward a display region of the panel 50 and sets a position of the touch or approach as an input coordinates (may also called specified coordinates or indicated coordinates). In other words, the coordinate detector 51 detects the input coordinates indicating the position of the touch or approach of the input object within the display region of the panel 50. In view of the above, the panel 50 and the coordinate detector 51 act as a touch panel or screen.

Figure 8:
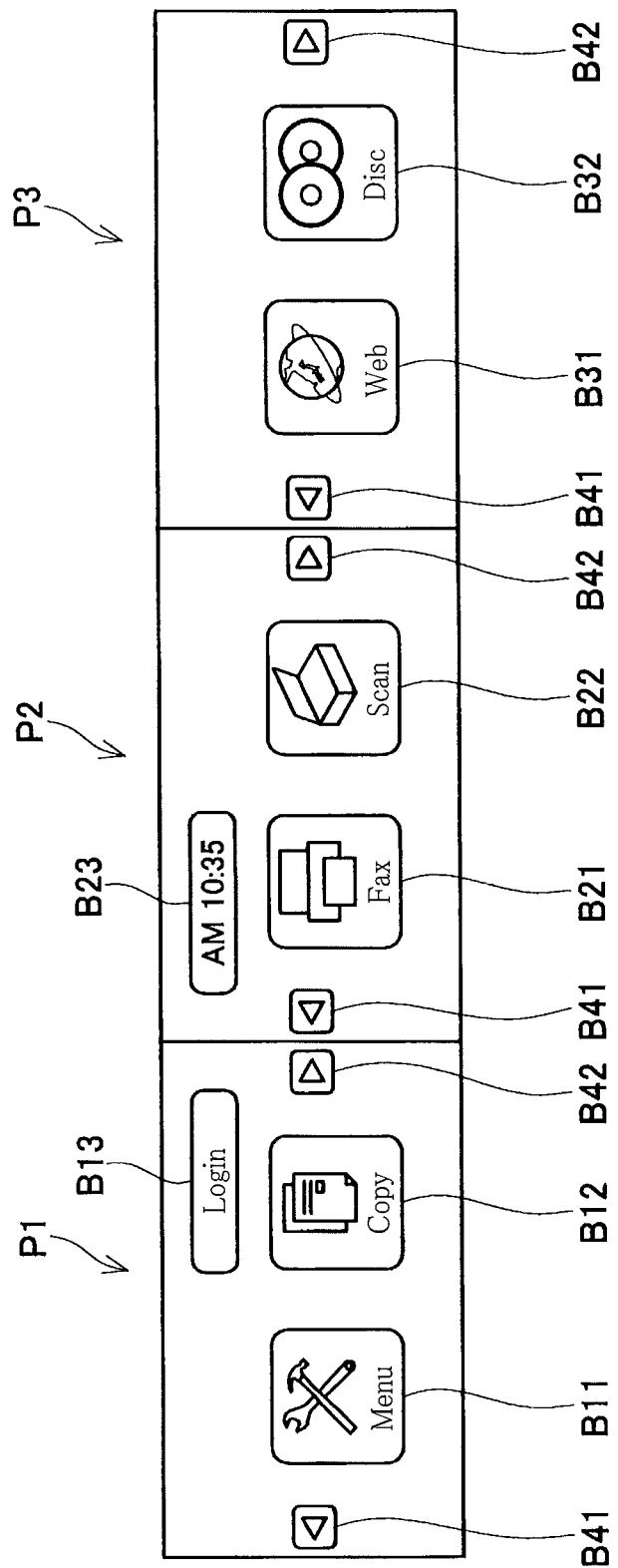
FIG. 8 is a view showing one example of display on a panel.

There will be next explained, with reference to FIG. 8, display screens to be displayed on the panel 50. Each display screen is an image composed of a background screen image which will be described below and images such as icons and buttons. Various images are displayed on the display screen using an application program interface (API) of the basic function program 18. In the example in FIG. 8, it is assumed that there are three background screen images P1-P3 arranged continuously in a row.

Displayed on the background screen image P1 are a Menu icon B11, a Copy icon B12, and a Login icon B13. A left arrow button B41 and a right arrow button B42 are also displayed on this background screen image P1. Each of the icons and buttons is an image for receiving a command or instruction for starting to execute a corresponding one of predefined processings. The Menu icon B11 when touched causes the panel 50 to display a screen for the user to make various settings of the MFP 10. The Copy icon B12 when touched causes the printing unit 54 to perform a printing operation. The Login icon B13 when touched causes the user to log in the MFP 10. Each of the left arrow button B41 and the right arrow button B42 when touched causes a switch of the display screen. Each of the left arrow button B41 and the right arrow button B42 is displayed at a corresponding one of fixed positions on the panel 50 even where any of the background screen images P1-P3 is displayed on the panel 50.

Displayed on the background screen image P2 are a FAX icon B21, a Scan icon B22, and a time icon B23. The left arrow button B41 and the right arrow button B42 are also displayed on this background screen image P2. Each of these icons and buttons other than the time icon B23 is an image for receiving a command or instruction for starting to execute a corresponding one of predefined processings. The FAX icon B21 when touched causes the facsimile portion 58 to perform a facsimile operation. The Scan icon B22 when touched causes the scanning portion 56 to perform a scanning operation. The time icon B23 shows a current time. Since the time icon B23 is not the type of image for receiving a command, even when the user touches the time icon B23, an icon animation processing which will be described below is not executed.

Displayed on the background screen image P3 are a Web icon B31 and a Disc icon B32. The left arrow button B41 and the right arrow button B42 are also displayed on this background screen image P3. Each of these icons and buttons is an image for receiving a command or instruction for starting to execute a corresponding one of predefined processings. The Web icon B31 when touched causes the panel 50 to display a screen for the user to operate the MFP 10 using data available on the internet. The Disc icon B32 when touched causes the MFP 10 to print an image on a recording face of a disc-like recording medium.

The NVRAM 40 stores various parameters. Examples of the parameters include a moving-speed threshold value, a predetermined distance, an apparatus lock flag, predetermined user information, the number of background screen frames BF, background-screen moving distances BD1-BD4, the number of icon frames IF, and icon moving distances ID1-ID5. The moving-speed threshold value is a parameter used by the CPU 14 to determine whether the coordinate detector 51 has detected a flick operation or a drag operation (or moving operation) input or performed by the user, specifically, to determine whether the coordinate detector 51 has detected the drag operation or not. The predetermined distance is a parameter used by the CPU 14 to determine whether a screen transition processing is executed or not. The predetermined distance may be half a width of each of the background screen images P1-P3, for example.

The apparatus lock flag is information indicating whether the MFP 10 is in a locked state or an unlocked state. The locked state allows only predetermined users registered in the MFP 10 to use the functions of the MFP 10 without any limit and allows the user not registered in the MFP 10 to use limited functions. The unlocked state allows any users to use the functions of the MFP 10 without any limits. The predetermined user information is used to identify the predetermined user or not. In the present embodiment, a user ID and a password are used as the predetermined user information. The apparatus lock flag and the predetermined user information may be set by the user in advance. It is noted that the number of background screen frames BF, the background-screen moving distances BD1-BD4, the number of icon frames IF, and the icon moving distances ID1-ID5 will be explained later.

The RAM 30 is a transitory memory having a storage area which stores various data created when the processings are executed according to the basic function program 18. Examples of the data stored include a background image position, an icon position, a background-screen moving direction, an icon-movement start direction, a login user information, a background-frame count value n, an icon-frame count value i, a background moving flag, an icon shaking flag, an input-coordinates movement flag, and a display-screen nonswitch flag.

The background image position is information indicating a position of each of the background screen images P1-P3 with respect to a display surface or region of the panel 50. The icon position is information indicating a position of each of the icons with respect to the background screen image. The icon position uses a predefined position of the background screen image (e.g., an upper left corner) as a reference. The background-screen moving direction is information indicating a direction of the movement of the background screen image. The icon-movement start direction as a direction of initial movement of shaking of the icon is information indicating a direction in which the icon starts to move with respect to the background screen image when shaking or wiggling. The login user information is information for identifying the user being logged in the MFP 10. One example of the login user information is the user ID.

The background-frame count value n is pointer information indicating for which frame of the background screen image the CPU 14 is executing a processing. The icon-frame count value i is pointer information indicating for which frame of the icon the CPU 14 is executing a processing. The background moving flag indicates whether the background screen image is moving or not. The icon shaking flag indicates whether the icon is moving or not. The input-coordinates movement flag indicates whether or not the input coordinates have moved from first input coordinates which are input coordinates the coordinate detector 51 had detected first in one drag operation. The display-screen nonswitch flag indicates that the display screen is not to be switched.

The printing unit 54 is designed to perform the printing operation. The printing unit 54 includes a sheet size sensor 54A and an ink amount sensor 54B. The sheet size sensor 54A detects the size of recording media set in the MFP 10 (e.g., the A4 size). The ink amount sensor 54B detects a remaining amount of ink (i.e., an ink amount) for each of ink cartridges mounted in the MFP 10. The scanning portion 56 is designed to read a document and create data based on a result of the reading. The facsimile portion 58 is designed to send and receive data representative of a document. The network interface 60 is coupled to a wired LAN line 4 to send and receive various data. The wireless-LAN communicating portion 61 is designed to communicate with an access point, not shown, using wireless LAN.

Overview of Background Animation Processing

There will be next explained an overview of the background animation processing with reference to FIGS. 9A-9E. FIGS. 9A-9E show a screen transition in an animation processing when the background screen image being displayed on the panel 50 is switched from the background screen image P1 to the background screen image P2. In this animation processing, the background screen image is moved on a frame-by-frame basis. Specifically, the background screen image P1 being displayed on the panel 50 is gradually moved leftward in FIG. 9A and removed from the panel 50. This movement is called a frame-out. In this frame-out, it is possible to consider that the background screen image displayed at first on the panel 50 disappears from the panel 50 by being moved to an outside of the display region of the panel 50. At the same time, the background screen image P2 is gradually moved leftward in FIG. 9A and added to the panel 50 from the right side. This movement is called a frame-in. In this frame-in, it is possible to consider that the background screen image not being on the panel 50 appears on the panel 50 by being moved into the display region of the panel 50.

Figure 9A:
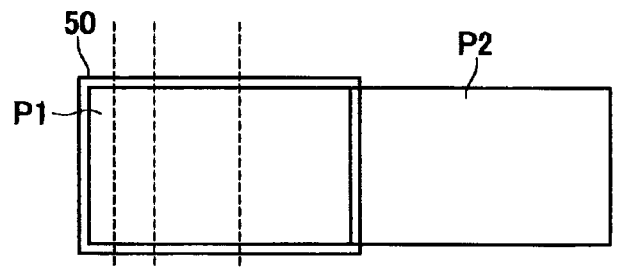
FIGS. 9A-9E are views generally showing a background animation processing.
Figure 9B:
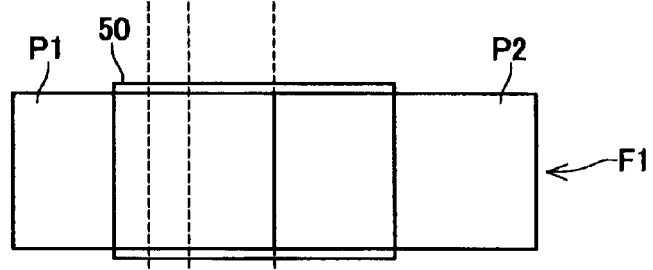
Figure 9C:
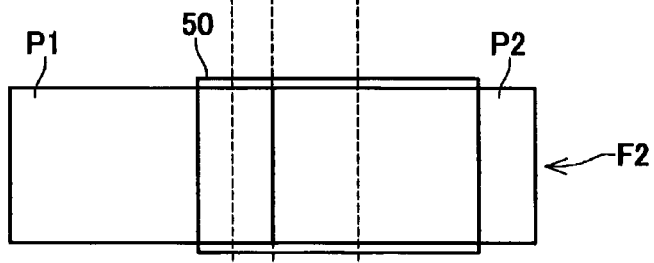
Figure 9D:
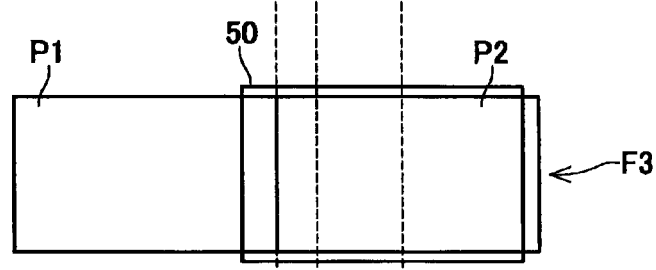
Figure 9E:
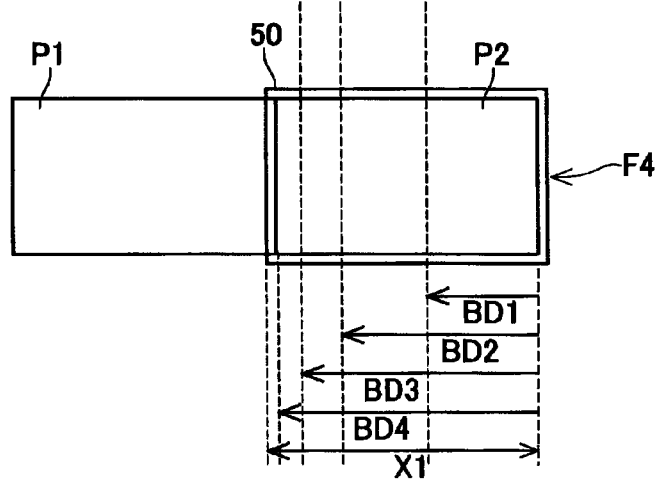

In this background animation processing, the background screen image P2 is gradually moved from a position of a frame F1 in FIG. 9B to a position of a frame F4 in FIG. 9E on the frame-by-frame basis. The number of these movements of the background screen image is defined as the number of background screen frames BF. In the example in FIGS. 9A-9E, the number of background screen frames BF is four.

Also, a distance of the movement of the newly displayed background screen image from a position of the background screen image just before the display shown in FIG. 9A is defined as the screen-image moving distance. In other words, the screen-image moving distance is a distance between the right side of the panel 50 and a left side of the newly displayed background screen image. In the example in FIGS. 9A-9E, the screen-image moving distances of the frames F1-F4 of the background screen image P2 respectively correspond to the background-screen moving distances BD1-BD4.

Overview of Icon Animation Processing>

There will be next explained an overview of the icon animation processing with reference to FIGS. 10A-10F. FIGS. 10A-10F show an animation processing when the icon B21 displayed on the background screen image is shaken. It is noted that this animation processing may be hereinafter referred to as "shaking display processing". FIGS. 10A-10F omit illustration of the figure that should be illustrated on the icon B21 for the sake of simplicity. In FIGS. 10A-10F, an icon reference position RP indicated by a broken line represents a position of the icon B21 displayed on the background screen image before and after the shaking display processing. Here, since the icon reference position RP is a position relative to the background screen image, the icon position is used to determine the position of the icon reference position RP to be displayed on the background screen image. Also, a one-dot chain line represents a center line of the icon reference position RP in a right and left direction. In the icon animation processing shown in FIGS. 10A-10F, as shown in FIG. 10A, an initial position (i.e., the reference position) of the icon B21 is initially determined by the icon position, with the predefined position of the background screen image (e.g., an upper left corner) used as a reference. Then, as shown in FIGS. 10B-10E, the icon B21 is repeatedly moved or reciprocated between a position located on a right side of the reference position as shown in FIGS. 10B, 10C, and 10E and a position located on a left side of the reference position as shown in FIG. 10D. As shown in FIG. 10F, the icon B21 is finally returned to the initial position again. The icon animation processing shown in FIG. 10 starts with the start of the background animation processing.

In this icon animation processing, the icon B21 is gradually moved from a position of a frame Fa1 to a position of a frame Fa5 on a frame-by-frame basis. The number of these movements of the icon is defined as the number of icon frames IF. In the example in FIGS. 10A-10F, the number of icon frames IF is five. Since the number of icon frames IF is greater than the number of background screen frames BF, the number of movements of the icon (five) is greater than the number of movements of the background screen image (four).

Also, a distance between a current position of the icon (i.e., a position of a current frame) and a position of a preceding frame is defined as the icon moving distance ID. In the example in FIGS. 10A-10F, the screen-image moving distances of the frames Fa1-Fa5 of the icon B21 respectively correspond to the icon moving distances ID1-ID5. The icon moving distances ID1-ID5 decrease with increase in the number of movements of the icon B21.

Operations of MFP 10

There will be next explained operations of the MFP 10 with reference to FIGS. 2-7. The flow charts in FIGS. 2-7 start with turning-on of the MFP 10 and end when the MFP 10 is turned off. In the present embodiment, there will be explained, by way of example, a processing for switching the background screen image displayed on the panel 50 from the background screen image P1 to the background screen image P2.

The flow begins with S301 at which the CPU 14 determines whether the MFP 10 is in the locked state or not. Specifically, the CPU 14 determines whether the apparatus lock flag stored in the NVRAM 40 is in the locked state or the unlocked state. When it is determined that the MFP 10 is in the unlocked state (S301: NO), the flow goes to S312. When it is determined that the MFP 10 is in the locked state (S301: YES), the flow goes to S302.

At S302, the CPU 14 determines whether or not the user has touched the Login icon B13 within the background screen image P1 in FIG. 8. When it is determined that the Login icon B13 has not been touched (S302: NO), the flow goes to S312. When it is determined that the Login icon B13 has been touched (S302: YES), the flow goes to S306.

At S306, the CPU 14 executes a login processing. The login processing is executed by receiving input of the user ID and the password, for example. In this example, when the user ID and the password input by the user match the predetermined user information (i.e., one set of the user ID and the password) stored in the NVRAM 40 in advance, the received user ID is stored in the RAM 30 as the login user information. This configuration allows the MFP 10 to identify which user is using the MFP 10 among a plurality of users.

At S312, the CPU 14 extracts icons for which the icon animation processing is to be executed. Specifically, the CPU 14 detects a state of the MFP 10 using various sensors such as the sheet size sensor 54A and the ink amount sensor 54B and then extracts, as the icons for which the icon animation processing is to be executed, icons capable of receiving the executing command in the detected state of the MFP 10 among the plurality of icons. The CPU 14 at S312 also initializes various flags stored in the RAM 30 such as the background moving flag and the icon shaking flag.

At S313, the CPU 14 determines whether the icon shaking flag stored in the RAM 30 is "Shaking" or not. When it is determined that the icon shaking flag is "Shaking" (S313: YES), the flow goes to S502 in FIG. 7. When it is determined that the icon shaking flag is not "Shaking" (S313: NO), the flow goes to S314. This configuration allows the CPU 14 to control the MFP 10 such that the touch input of the user is not accepted during the icon animation processing.

At S314, the CPU 14 determines whether the touch input of the user on the coordinate detector 51 is being received or not. When it is determined that the touch input is not being received (S314: NO), the flow repeats S314. When it is determined that the touch input is being received (S314: YES), the flow goes to S315. At S315, the CPU 14 stores first input coordinates into the RAM 30. The first input coordinates are coordinates indicating a position the user has touched first within the coordinate detector 51.

At S316, the CPU 14 determines whether the touch input of the user is being detected or not. Here is explained one example of how to determine whether the touch input of the user is being detected or not. The CPU 14 uses the coordinate detector 51 to detect the input coordinates. When the input coordinates are detected, it is determined that the touch input is being detected (S316: YES), and the flow goes to S360. It is noted that the processings at S316-S384 are repeated every predetermined detecting period, e.g., every several tens milliseconds, using loop processing, whereby the input coordinates are regularly detected every predetermined detecting period. These processings allow the coordinate detector 51 to detect continuous touch input of the user.

At S360, the CPU 14 stores the detected input coordinates into the RAM 30. At S362, the CPU 14 determines whether the input-coordinates movement flag stored in the RAM 30 is "Moved" or not. When it is determined that the input-coordinates movement flag is "Moved" (S362: YES), the flow goes to S368. When it is determined that the input-coordinates movement flag is "Not Moved" (S362: NO), the flow goes to S364. At S364, the CPU 14 determines whether the input coordinates detected in the most recent detecting period have been moved from the first input coordinates stored in the RAM 30 or not, that is, the CPU 14 determines whether the input coordinates detected are different from the first input coordinates or not. When it is determined that the input coordinates detected have not been moved from the first input coordinates (S364: NO), the flow returns to S316. When it is determined that the input coordinates detected have been moved from the first input coordinates (S364: YES), the flow goes to S366. At S366, the CPU 14 changes the input-coordinates movement flag from "Not Moved" as a default setting to "Moved".

At S368, the CPU 14 calculates an input-coordinates moving distance and stores it into the RAM 30. The input-coordinates moving distance is a distance from the input coordinates detected in the preceding detecting period to the input coordinates detected in the most recent detecting period. The CPU 14 also changes the background image position stored in the RAM 30 based on the calculated input-coordinates moving distance. At S370, the CPU 14 executes a screen display processing that is a processing in which the CPU 14 controls the panel 50 to display the background screen image and the icon images based on the background image position and the icon position stored in the RAM 30. Upon completion of this processing, the flow returns to S316. In the manner described above, the image display processing is executed such that the background screen image and the icon images move so as to follow the movement of the touched position.

On the other hand, when it is determined at S316 that the touch input is not being detected (S316: NO), the CPU 14 determines that the input object has been moved off the coordinate detector 51, in other words, the user has performed a release operation, and the flow goes to S372 in FIG. 3. At S372, the CPU 14 determines whether the input-coordinates movement flag stored in the RAM 30 is "Moved" or not. When it is determined that the input-coordinates movement flag is "Moved" (S372: YES), the flow goes to S374.

At S374, the CPU 14 executes the background animation processing in which the background screen image is displayed on the panel 50 so as to move. At S376, the CPU 14 executes the icon animation processing in which various icons are displayed on the panel 50 so as to move. Upon completion of S376, the flow returns to S313 in FIG. 2.

On the other hand, when it is determined at S372 that the input-coordinates movement flag is not "Moved" (S372: NO), the flow goes to S380. At S380, the CPU 14 determines whether or not the user has touched any of the icons and the arrow buttons. Here is explained, with reference to the background screen image P1 in FIG. 8, an example of how to determine whether the icon or button has been touched or not. The ROM 16 stores in advance coordinates indicating display areas of the Menu icon B11, the Copy icon B12, the Login icon B13, the left arrow button B41, and the right arrow button B42. When the input coordinates stored into the RAM 30 at S315 are located within any of the display areas of the Menu icon B11, the Copy icon B12, the Login icon B13, the left arrow button B41, and the right arrow button B42, the CPU 14 can determine that the user has touched the icon or button on which the input coordinates are located, in other words, the CPU 14 can determine that the touch operation has been input on the icon or button on which the input coordinates are located. When the user does not touch any of the icons and buttons (S380: NO), the flow returns to S301. When the user touches any of the icons and buttons (S380: YES), the flow goes to S382.

At S382, the CPU 14 determines whether the user has touched any of the icons or not. When it is determined that the user has touched the arrow button (S382: NO), the flow goes to S374. On the other hand, it is determined that the user has touched any of the icons (S382: YES), the flow goes to S384.

At S384, the CPU 14 executes the processing assigned to the touched icon. In the background screen image P1 in FIG. 8, when the user touches the Copy icon B12, for example, a copying operation is performed using the printing unit 54 and the scanning portion 56. Upon completion of S384, the flow returns to S301 in FIG. 2.

Background Animation Processing

Figure 4:
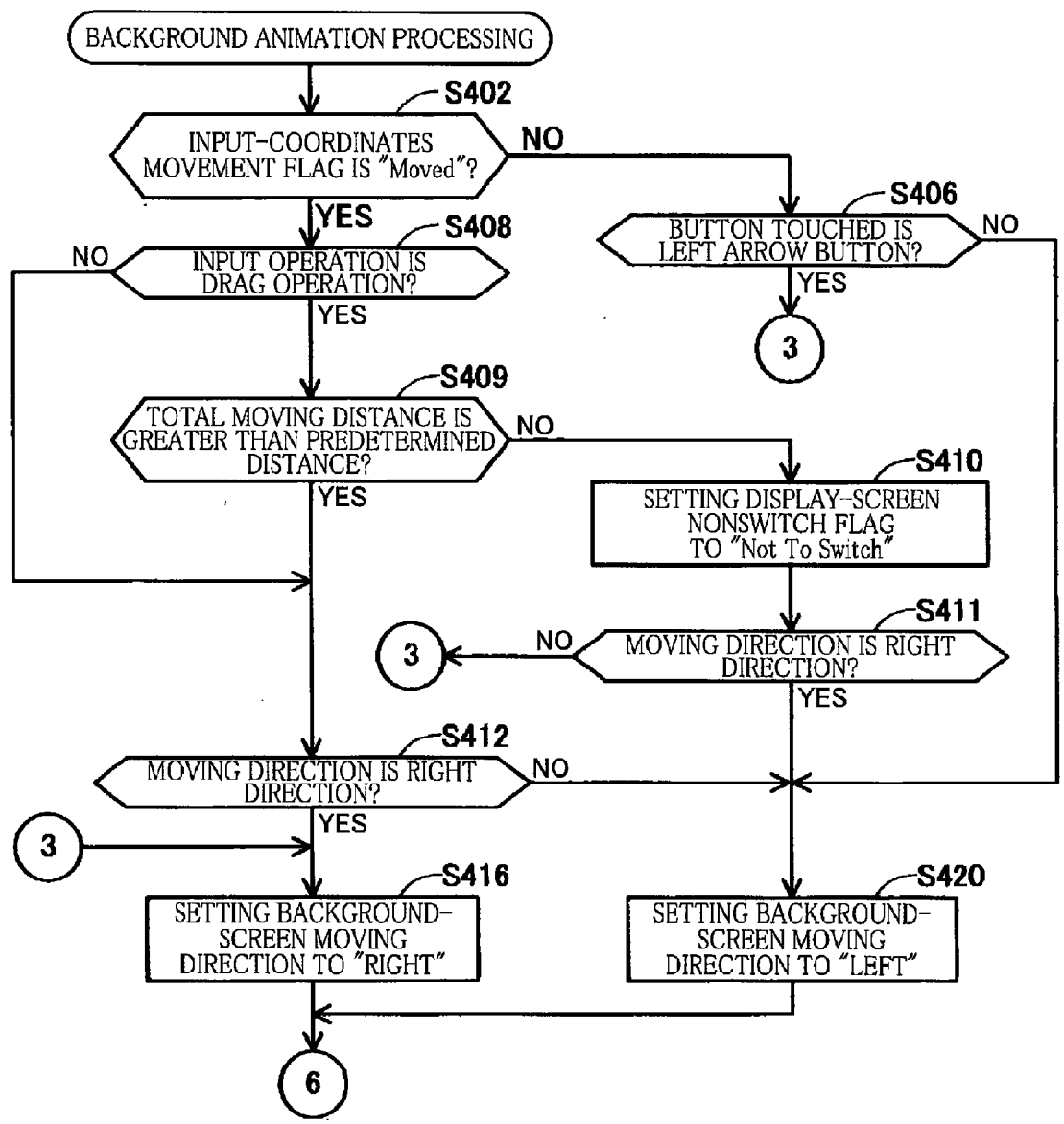
FIG. 4 is another flow chart showing operations of the MFP.
Figure 5:
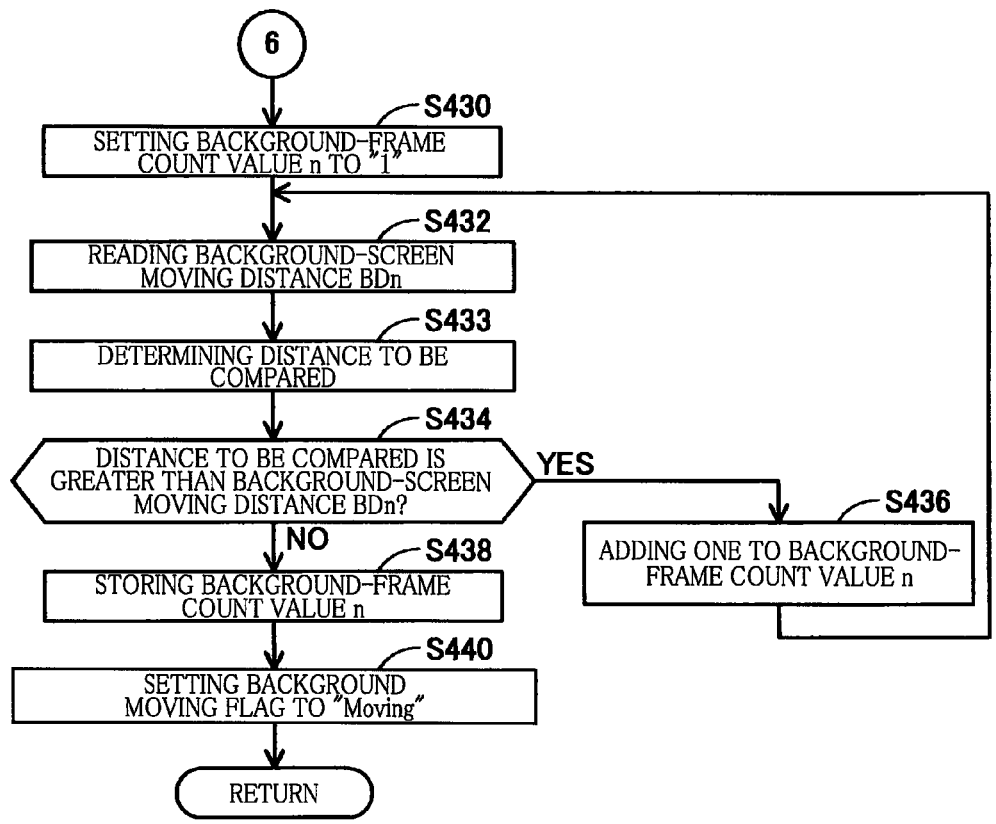
FIG. 5 is another flow chart showing operations of the MFP.

There will be next explained the background animation processing executed at S374 with reference to FIGS. 4 and 5. As in the processing at S372, the CPU 14 at S402 determines whether the input-coordinates movement flag stored in the RAM 30 is "Moved" or not. When it is determined that the input-coordinates movement flag is not "Moved" (S402: NO), the flow goes to S406 at which the CPU 14 determines whether the button touched is the left arrow button B41 or not. When it is determined that the button touched is the left arrow button B41 (S406: YES), the flow goes to S416 at which the CPU 14 sets the background-screen moving direction stored in the RAM 30 to the right direction. On the other hand, when it is determined that the button touched is the right arrow button B42 (S406: NO), the flow goes to S420 at which the CPU 14 sets the background-screen moving direction stored in the RAM 30 to the left direction.

On the other hand, when it is determined at S402 that the input-coordinates movement flag is "Moved" (S402: YES), the flow goes to S408. At S408, the CPU 14 determines whether the operation received by the coordinate detector 51 is the drag operation or not. Here is explained one example of how to distinguish between the flick operation and other operations including the drag operation. The CPU 14 uses the coordinate detector 51 to detect the input coordinates every predetermined detecting period, e.g., every several tens milliseconds. When the coordinate detector 51 ceases detecting the input coordinates after the detection of the movement of the input coordinates, the CPU 14 calculates a moving speed of the input coordinates (i.e., a speed of the movement of the input object). The moving speed of the input coordinates is calculated based on the detecting period and a distance between two sets of the input coordinates most recently detected before the coordinate detector 51 ceases detecting the input coordinates. When the calculated moving speed of the input coordinates is greater than the predefined moving-speed threshold value, the CPU 14 determines that the input operation is the flick operation (S408: NO), and the flow goes to S412. On the other hand, when the calculated moving speed of the input coordinates is less than the predefined moving-speed threshold value, the CPU 14 determines that the input operation is the drag operation (S408: YES), and the flow goes to S409.

At S409, the CPU 14 determines whether a total moving distance of the input coordinates input with the drag operation, from the first input coordinates in a right and left direction of the panel 50 is greater than the predetermined distance or not. The predetermined distance may be half the width of each of the background screen images P1-P3, for example. When it is determined that the input-coordinates moving distance is greater than the predetermined distance (S409: YES), the flow goes to S412.

At S412, the CPU 14 determines whether a direction of the movement of the input coordinates, i.e., a moving direction of the input coordinates, detected by the coordinate detector 51 is the right direction or not. When it is determined that the moving direction of the input coordinates is the right direction (S412: YES), the flow goes to S416. On the other hand, when it is determined at S412 that the moving direction of the input coordinates is the left direction (S412: NO), the flow goes to S420.

On the other hand, when it is determined at S409 that the total moving distance of the input coordinates is not greater than the predetermined distance (S409: NO), the flow goes to S410. At S410, the CPU 14 changes the display-screen nonswitch flag stored in the RAM 30 from "To Switch" as a default setting to "Not To Switch".

At S411, the CPU 14 determines whether the moving direction of the input coordinates detected by the coordinate detector 51 is the right direction or not. When it is determined that the moving direction of the input coordinates is the right direction (S411: YES), the flow goes to S420 at which the CPU 14 sets the background-screen moving direction stored in the RAM 30 to the left direction. With these processings, in the case where the background screen image moves rightward following the rightward movement of the input coordinates on the panel 50, the CPU 14 can control the panel 50 not to switch the display screen by moving the background screen image leftward back to its original position. On the other hand, when it is determined at S411 that the moving direction of the input coordinates is the left direction (S411: NO), the flow goes to S416 at which the CPU 14 sets the background-screen moving direction stored in the RAM 30 to the right direction. With these processings, in the case where the background screen image moves leftward, the CPU 14 can control the panel 50 not to switch the display screen by moving the background screen image rightward back to its original position.

At S430 in FIG. 5, the CPU 14 sets the background-frame count value n stored in the RAM 30 to "1". At S432, the CPU 14 reads a background-screen moving distance BDn of an nth frame of the background screen image P2. At S433, the CPU 14 determines a distance to be compared. Specifically, where the display-screen nonswitch flag is "To Switch", the total moving distance of the input coordinates is determined as the distance to be compared. Where the display-screen nonswitch flag is "Not To Switch", the CPU 14 determines, as the distance to be compared, a distance that is obtained by subtracting the total moving distance of the input coordinates from a width X1 (see FIGS. 9A-9E) of the display region of the panel 50 in the right and left direction.

At S434, the CPU 14 determines whether the distance to be compared which is determined at S433 is greater than the background-screen moving distance BDn of the nth frame or not. When it is determined that the distance to be compared is greater than the background-screen moving distance BDn (S434: YES), the flow goes to S436. At S436, the CPU 14 adds one to the background-frame count value n, and the flow returns to S432. On the other hand, when it is determined that the distance to be compared is not greater than the background-screen moving distance BDn (S434: NO), the CPU 14 determines that the background animation processing is to be started from the nth frame, and the flow goes to S438.

At S438, the CPU 14 stores, into the RAM 30, the value of the background-frame count value n which is determined at S434. At S440, the CPU 14 sets the background moving flag to "Moving", and the flow ends.

Icon Animation Processing

Figure 6:
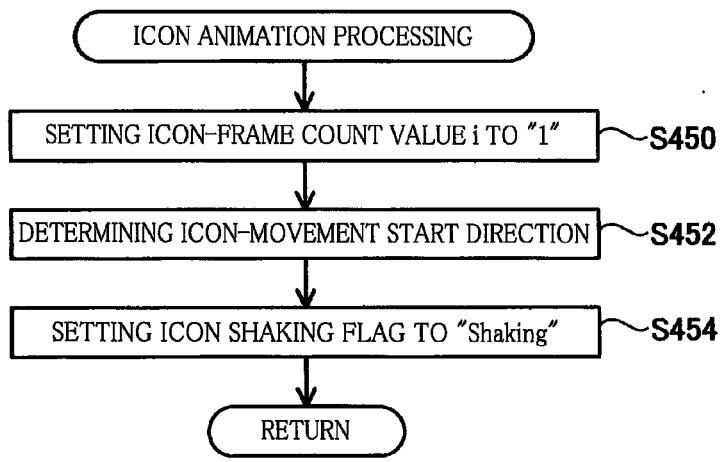
FIG. 6 is another flow chart showing operations of the MFP.

There will be next explained the icon animation processing executed at S376 with reference to FIG. 6. At S450, the CPU 14 sets the icon-frame count value i stored in the RAM 30 to "1". At S452, the CPU 14 determines the icon-movement start direction in which the icon starts to move with respect to the background screen image when shaking or wiggling. Specifically, when the background-screen moving direction is the right direction set at S416, the CPU 14 sets the icon-movement start direction stored in the RAM 30 to the left direction. When the background-screen moving direction is the left direction set at S420, the CPU 14 sets the icon-movement start direction stored in the RAM 30 to the right direction. At S454, the CPU 14 sets the icon shaking flag to "Shaking", and the flow ends.

Operations of MFP 10 (Continued)

Returning now to FIG. 2, when it is determined at S313 that the icon shaking flag is "Shaking" (S313: YES), the flow goes to S502 in FIG. 7. At S502, the CPU 14 determines whether the background moving flag stored in the RAM 30 is "Moving" or not. When it is determined that the background moving flag is not "Moving" (S502: NO), the flow goes to S520. When it is determined that the background moving flag is "Moving" (S502: YES), the flow goes to S510.

At S510, the CPU 14 reads or gets a frame of the background screen image which corresponds to the background-frame count value n of the background screen image P2. At S512, the CPU 14 sets the background image position to a position of the frame read at S510.

At S514, the CPU 14 determines whether or not the background-frame count value n is equal to or greater than the number of background screen frames BF. When it is determined that the background-frame count value n is less than the number of background screen frames BF (S514: NO), the flow goes to S518 at which the CPU 14 adds one to the background-frame count value n, and the flow goes to S520. On the other hand, when it is determined that the background-frame count value n is equal to or greater than the number of background screen frames BF (S514: YES), the flow goes to S516 at which the CPU 14 sets the background moving flag to "Stop", and the flow goes to S520.

At S520, the CPU 14 determines whether the icon shaking flag stored in the RAM 30 is "Shaking" or not. When it is determined that the icon shaking flag is not "Shaking" (S520: NO), the flow goes to S542. When it is determined that the icon shaking flag is "Shaking" (S520: YES), the flow goes to S530.

At S530, the CPU 14 reads or gets a frame of the icon which corresponds to the icon-frame count value i. At S534, the CPU 14 sets only each of the icons extracted at S312 as the icon for which the icon animation processing is to be executed, to the position of the frame read at S530.

At S536, the CPU 14 determines whether or not the icon-frame count value i is equal to or greater than the number of icon frames IF. When it is determined that the icon-frame count value i is less than the number of icon frames IF (S536: NO), the flow goes to S540 at which the CPU 14 adds one to the icon-frame count value i, and the flow goes to S542. On the other hand, when it is determined that the icon-frame count value i is equal to or greater than the number of icon frames IF (S536: YES), the flow goes to S538 at which the CPU 14 sets the icon shaking flag to "Stop", and the flow goes to S542. At S542, the CPU 14 executes the screen display processing, and the flow returns to S313. It is noted that the screen display processing executed at S542 is similar to the screen display processing executed at S370, and an explanation of which is dispensed with.

Example of Operations

Figure 11:
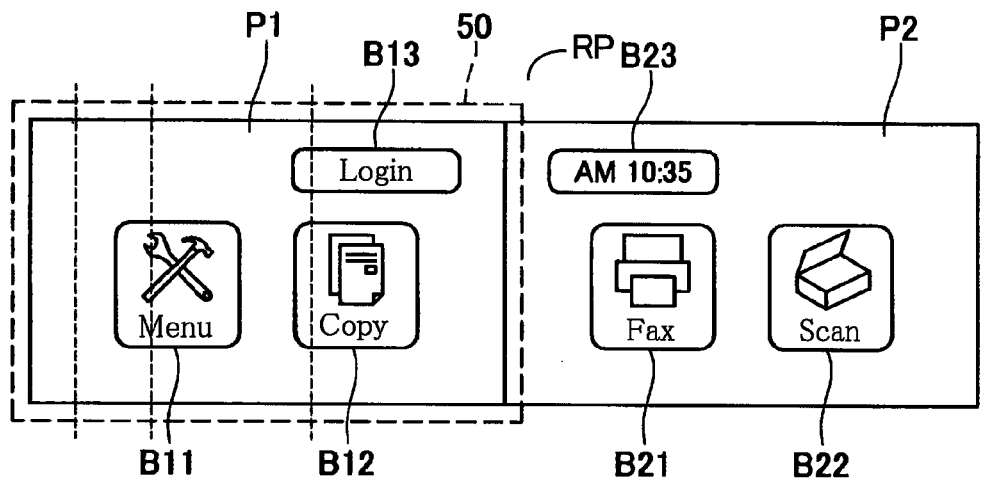
FIG. 11 is a view showing another example of display on the panel.
Figure 13:
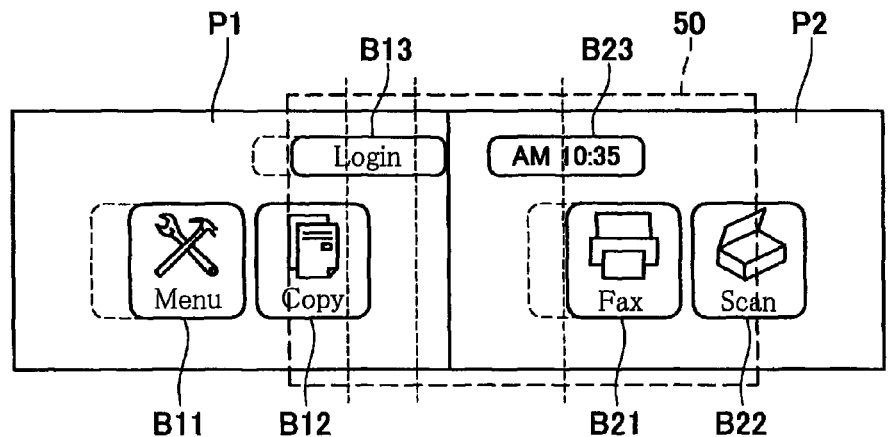
FIG. 13 is a view showing another example of display on the panel.
Figure 14:
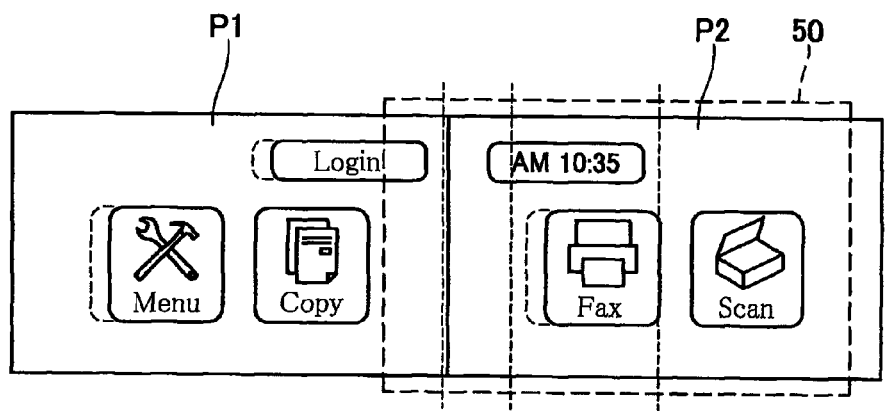
FIG. 14 is a view showing another example of display on the panel.
Figure 15:
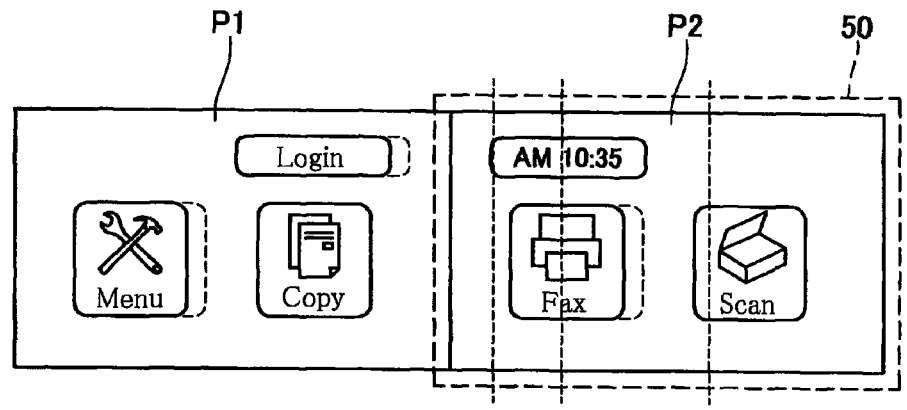
FIG. 15 is a view showing another example of display on the panel.

There will be next explained one example of operations of the MFP 10 with reference to FIGS. 11-15. In the present embodiment, there will be explained, by way of example, operations in a case where the user inputs the leftward drag operation to switch the state in which the background screen image P1 is displayed on the panel 50 as shown in FIG. 11 to the state in which the background screen image P2 is displayed on the panel 50 as shown in FIG. 15. In this case, it is assumed that the ink amount sensor 54B is detecting that there is no ink.

The CPU 14 at S312 detects that the MFP 10 is out of ink. The CPU 14 then extracts the icons for which the icon animation processing is to be executed, that is, the CPU 14 extracts the icons B11, B13, B22, and B31. Since the processings caused by the Copy icon B12, the FAX icon B21, and the Disc icon B32 cannot be executed due to the lack of ink, the CPU 14 inhibits these icons from receiving the executing commands.

Figure 12:
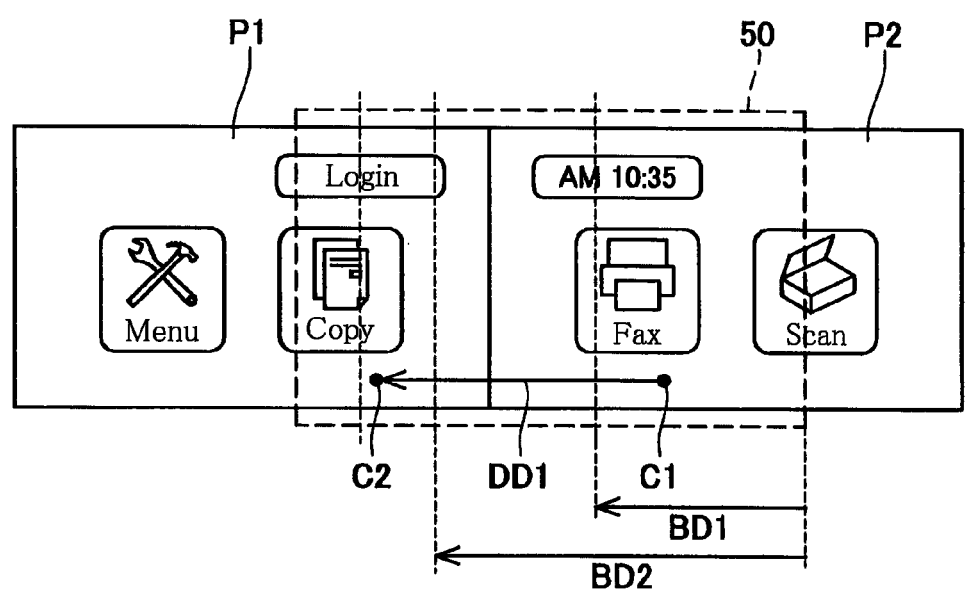
FIG. 12 is a view showing another example of display on the panel.

As shown in FIG. 12, when the user inputs the leftward drag operation on the coordinate detector 51 (S314: YES), the CPU 14 at S315 stores first input coordinates C1 into the RAM 30. The first input coordinates C1 are coordinates the coordinate detector 51 had detected first in the drag operation. Since the touch input is being detected (S316: YES) and the input coordinates have been moved from the first input coordinates (S364: YES), the CPU 14 at S366 sets the input-coordinates movement flag to "Moved". The CPU 14 at S368 calculates the input-coordinates moving distance and stores it into the RAM 30. The CPU 14 at S368 changes the background image position stored in the RAM 30 based on the calculated input-coordinates moving distance. The CPU 14 at S370 executes the screen display processing to draw the background screen image P2 and the icons at their respective positions after the movement. As a result, as shown in FIG. 12, the background screen images P1 and P2 are moved leftward following the movement of the input object. This movement causes a left portion of the background screen image P1 to disappear from the panel 50 and a left portion of the background screen image P2 to appear on the panel 50.

When the user moves the input object off the coordinate detector 51 at input coordinates C2, the CPU 14 determines that the release operation has been performed (S316: NO). Since the input-coordinates movement flag is "Moved" (S372: YES), the CPU 14 at S374 starts the background animation processing. Since the input-coordinates movement flag is "Moved" (S402: YES), and the moving speed of the input coordinates is less than the predefined moving-speed threshold value, the CPU 14 determines that the drag operation has been performed (S408: YES). As shown in FIG. 12, since a total moving distance DD1 traveled leftward by the input object on the panel 50 is greater than the predetermined distance (S409: YES), the CPU 14 sets the background-screen moving direction stored in the RAM 30 to the left direction (S412: NO, S420).

The CPU 14 at S430 sets the background-frame count value n stored in the RAM 30 to "1". The CPU 14 at S432 reads or fetches a background-screen moving distance BD1 of the frame F1 of the background screen image P2. Since the display-screen nonswitch flag is "To Switch", the CPU 14 at S433 determines the total moving distance DD1 as the distance to be compared. Since the distance to be compared, i.e., the total moving distance DD1, is greater than the background-screen moving distance BD1 (S434: YES), the CPU 14 at S436 sets the background-frame count value n to "2". The CPU 14 at S432 reads or fetches a background-screen moving distance BD2 of a frame F2 of the background screen image P2. Since the distance to be compared, i.e., the total moving distance DD1, is not greater than the background-screen moving distance BD2 (S434: NO), the CPU 14 determines that the background animation processing is to be started from the frame F2, and at S438 sets the background-frame count value n to "2". The CPU 14 at S440 sets the background moving flag to "Moving".

The CPU 14 at S450 sets the icon-frame count value i stored in the RAM 30 to "1". The CPU 14 at S452 sets the icon-movement start direction stored in the RAM 30 to the right direction. The CPU 14 at S454 sets the icon shaking flag to "Shaking".

Since the icon shaking flag is "Shaking" (S313: YES), and the background moving flag is "Moving" (S502: YES), the CPU 14 at S510 reads the frame F2 corresponding to "2" of the background-frame count value n. The CPU 14 at S512 sets the position of the background screen image P2 at the position of the frame F2. Since the background-frame count value n ("2") is less than the number of background screen frames BF("4") (S514: NO), the CPU 14 at S518 sets the background-frame count value n to "3".

Since the icon shaking flag is "Shaking" (S520: YES), the CPU 14 at S530 reads the frame Fa1 (see FIGS. 10A-10F) corresponding to "1" of the icon-frame count value i. The CPU 14 at S534 sets only each of the icons for which the icon animation processing is to be executed (i.e., the icons B11, B13, and B21) among the background screen image P1 and the background screen image P2, to the position of the frame Fa1. Since the icon-frame count value i ("1") is less than the number of icon frames IF ("5") (S536: NO), the CPU 14 at S540 sets the icon-frame count value i to "2".

The CPU 14 at S542 executes the screen display processing to draw the background screen image P2 and the icons at their respective positions after the movement. As a result, a state shown in FIG. 13 is established, that is, the background screen image P2 is moved to the position of the frame F2 in FIG. 9C while each of the icons B11, B13, and B21 is moved to the position of the frame Fa1 in FIG. 10B. Thus, the icons B11, B13, and B21 start shaking. It is noted that the icons B12, B22, and B23 do not shake.

Figure 7:
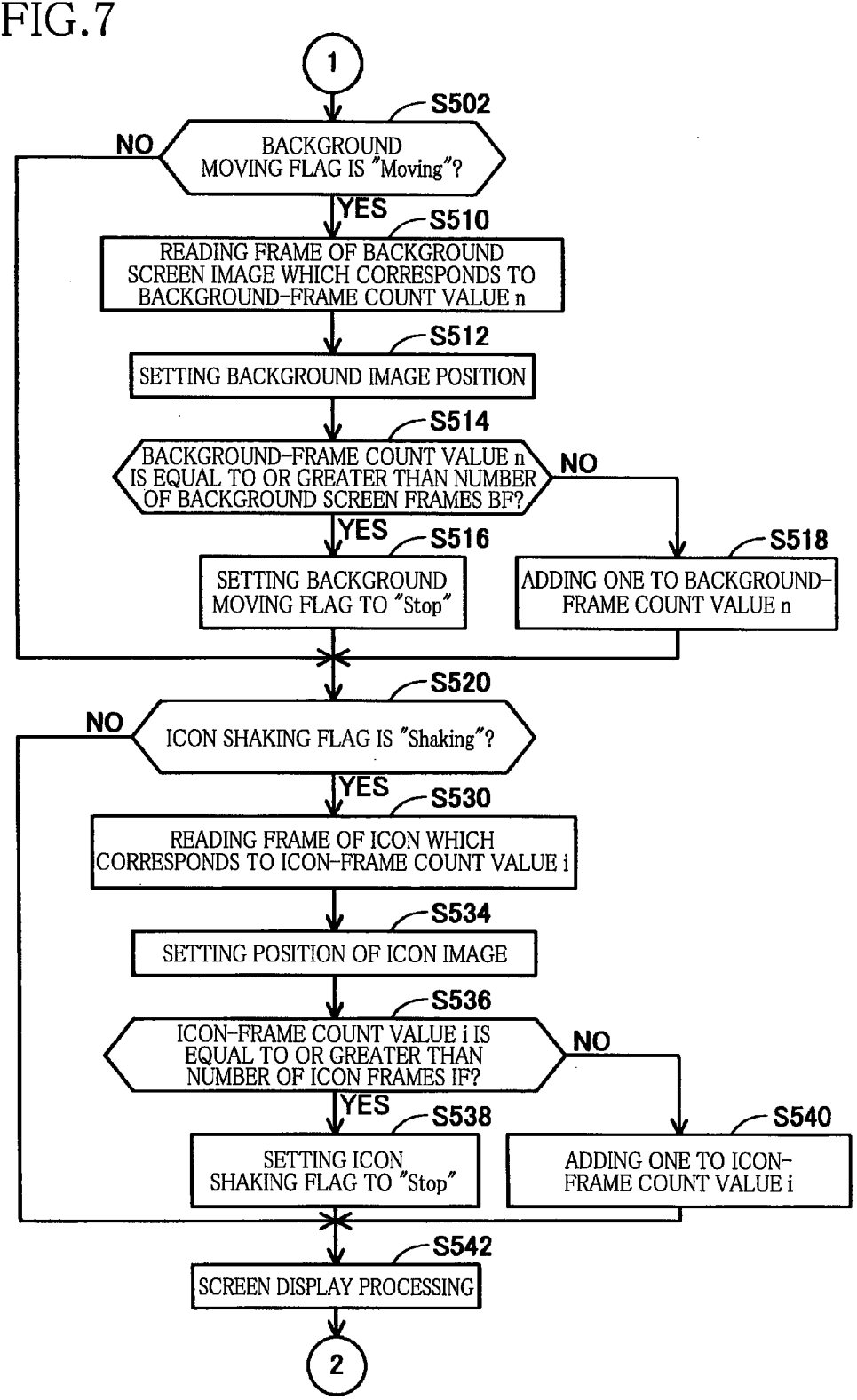
FIG. 7 is another flow chart showing operations of the MFP.

The processings at S502-S540 in FIG. 7 are then executed for the second time as a second loop processing as in the manner described above. As a result, a state shown in FIG. 14 is established, that is, the background screen image P2 is moved to a position of a frame F3 in FIG. 9D while each of the icons B11, B13, and B21 is moved to a position of a frame Fa2 in FIG. 10C.

When the processings at S502-S540 in FIG. 7 are then executed for the third time as a third loop processing, the background-frame count value n ("4") becomes equal to or greater than the number of background screen frames BF ("4") (S514: YES). Thus, the CPU 14 determines that the background animation processing is finished and at S516 sets the background moving flag to "Stop". As a result, a state shown in FIG. 15 is established, that is, the background screen image P2 is moved to the position of the frame F4 in FIG. 9E, and the switch of the screen ends. Each of the icons B11, B13, and B21 is moved to a position of a frame Fa3 in FIG. 10D.

When the processings at S502-S540 in FIG. 7 are then executed for the fourth time as a fourth loop processing, each of the icons B11, B13, and B21 is moved to a position of a frame Fa4 in FIG. 10E. Thus, the icons B11, B13, and B21 shake, with the background screen image P2 kept stopped.

When the processings at S502-S540 in FIG. 7 are then executed for the fifth time as a fifth loop processing, the icon-frame count value i ("5") becomes equal to or greater than the number of icon frames IF ("5") (S536: YES). Thus, the CPU 14 determines that the icon animation processing is finished and at S538 sets the icon shaking flag to "Stop". As a result, each of the icons B11, B13, and B21 is stopped, and the shaking display processing is finished. The CPU 14 then resets the input-coordinates movement flag stored in the RAM 30, the display-screen nonswitch flag, and other parameters.

Effects

There will be next explained effects of the MFP 10 according to the present embodiment. In the MFP 10 according to the present embodiment, during and after the switch of the background screen image from one to another, the icon images respectively for receiving the processing executing commands can be displayed so as to shake. As a result, even in the case where the icons not capable of receiving the respective processing executing commands, e.g., the time icon B23 in FIG. 8, are also displayed on the switched background screen image, the user can easily recognize the icons capable of receiving the respective processing executing commands, thereby improving usability for the user.

In the MFP 10 according to the present embodiment, the shaking display processing is continued so as to display the icons shaking on the background screen image also after the background screen image is entirely displayed upon completion of the display switch processing. As a result, the shaking icons can be displayed on the background screen image not moving because of the completion of the display switch processing, allowing the user to reliably recognize the icons.

In the MFP 10 according to the present embodiment, the icon moving distance decreases from the icon moving distance ID1 to the icon moving distance ID5 as shown in FIGS. 10A-10F. Thus, each icon can be shaken such that the moving distance of the shaking gradually decreases with the passage of time from the start of the shaking, making it possible to finish the shaking display processing naturally.

In the MFP 10 according to the present embodiment, only the icons associated with the functions being used in the MFP 10 can be shaken and displayed at S312. Thus, the user can easily find a desired icon.

In the MFP 10 according to the present embodiment, the background screen image can be switched by the user touching any position of the display region of the panel 50 and moving the touched point so as to flick the input object in the right and left direction. This allows the user to switch the background screen image by an intuitive operation, enhancing the usability for the user.

The technological elements described in the present specification or the drawings exhibit technological utility alone or in various combinations and are not limited to the combinations disclosed in the claims at the time of application. Furthermore, the technology illustrated in the present specification or the drawings may simultaneously achieve a plurality of objects, and have technological utility by achieving one of these objects.

Modifications

There will be next explained modifications of the embodiment described above. While the input coordinates are moved leftward on the panel 50 in the example of the operations (in FIGS. 11-15) in the above-described embodiment, similar processings can be executed also in the case where the input coordinates are moved rightward on the panel 50. To execute the similar processings between the case where the input coordinates are moved leftward and the case where the input coordinates are moved rightward, the CPU 14 may define the moving direction of the input coordinates as a forward direction to execute the various comparisons. For example, when comparing at S434 between the distance to be compared and the background-screen moving distance BDn of the nth frame, the CPU 14 may use the moving direction of the coordinates as the forward direction. In this case, when the input coordinates move leftward, the left direction is used as the forward direction, and the right direction is used as a reverse direction.

At S312, various methods can be used to execute the processing for extracting the icons for which the icon animation processing is to be executed. For example, the icons for which the icon animation processing is to be executed may be extracted based on the login user information obtained at S306. In this case, when the MFP 10 is in the locked state, the Menu icon B11 may be set such that only the predetermined users registered in the MFP 10 in advance can select the Menu icon B11. For example, only in the case where the login user information indicates the predetermined user, the shaking display processing is executed for the Menu icon B11. Accordingly, the CPU 14 can shake and display only the icons that can be selected by the user currently using the MFP 10. This allows the user to easily find the desired icon.

While the positions of the frames F1-F4 of the background screen image shown in FIGS. 9A-9E and the positions of the frames Fa1-Fa5 of the icon shown in FIGS. 10A-10F are stored in the ROM 16 and the NVRAM 40 in advance in the above-described embodiment, the present invention is not limited to this configuration. For example, the animation processing may be executed using various mathematical expressions. In this case, the animation processing may be executed by calculating an initial moving speed of the background screen image based on the drag operation or the flick operation using a velocity decay function and then gradually decreasing the calculated initial moving speed with the passage of time.

The number of the background screen images is not limited to three and may be more than or less than three. Also, the direction of the movement of the background screen images is not limited to the right and left direction of the panel 50 and may be any directions. For example, the CPU 14 may switch the background screen image such that the background screen images are arranged in an up and down direction, and the background screen image to be displayed is switched in response to the drag operation or the flick operation in the up and down direction.

While the icons start shaking in response to the release operation (S316: NO) in the above-described embodiment, the present invention is not limited to this configuration. For example, the icons may start shaking in response to the drag operation (S316: YES).

The direction of the shaking of the icons in the icon animation processing is not limited to the right and left direction of the panel 50 and may be any directions. For example, the direction may be the up and down direction of the panel 50. Also, the icon animation processing may be executed such that each icon displayed is changed in size and/or color in addition to the execution of the shaking display processing.

The icon not receiving the processing executing command is not limited to the time icon B23. That is, any icon may be displayed as long as the icon represents information regarding the state of the MFP 10.

The number of the icons displayed on each of the background screen images P1-P3 is not limited to the numbers as in the above-described embodiment. The effects of the present invention can be obtained even where the number is one or more than four.

The technique of the present invention relates to the display of the panel 50. Thus, the present invention may be applied not only to the MFP 10 but also to various devices having a display screen, e.g., a mobile phone and a notebook PC.

It is noted that various information stored in the ROM 16 and the NVRAM 40 may be stored in an external storage device. In this case, the information may be read from the external storage device and temporarily stored into the RAM 30 to execute the various processings. Examples of the external storage device include a memory card and an external hard disk.

In view of the above, the panel 50 is one example of a display. The MFP 10 is one example of an image forming apparatus. The CPU 14 can be considered to include a first display controller for executing the processing at S512. The CPU 14 can also be considered to include a second display controller for executing the processing at S534. The CPU 14 can also be considered to include a processing executing unit for executing the processing at S319. The CPU 14 can also be considered to include a function extractor for executing the processing at S312. The CPU 14 can also be considered to include a user identification unit for executing the processing at S306. Each of the icon images and button images is one example of an object image. Each of the positions of the left arrow button B41 and the right arrow button B42 within the display region is one example of a first position. The upper left corner of the background screen image is one example of a second position. The number of background screen frames BF is one example of a first number of times. The number of icon frames IF is one example of a second number of times.

What is claimed is:

1. An image forming apparatus, comprising:
    a display configured to display a plurality of images thereon;
    a coordinate detector configured to detect an input coordinate which is a coordinate indicating a position of an input object having touched or approached the display; and
    a controller configured to:
    control the display to display at least one first object image which receives a command for executing a corresponding predefined processing at a first position and at least one second object image which does not receive a command at a second position;
    determine, based on a detection of the input coordinate by the coordinate detector, whether at least one third object image, which receives a command for executing a corresponding predefined processing and is different from the at least one first object image, is to be displayed at the first position in place of the at least one first object image;
    control the display to display the at least one third object image in place of the at least one first object image at the first position when it is determined that the at least one third object image is to be displayed in place of the at least one first object image;
    in response to a detection of a release of the input object by the coordinate detector, control the display to repeatedly move the at least one third object image between a position located distant from the first position in a first direction and a position located distant from the first position in a second direction that is opposite the first direction, and control the display to display, at the second position, the at least one second object image which does not repeatedly move in the first direction and the second direction.

2. The image forming apparatus according to claim 1, wherein the controller is configured to determine that the at least one third object image is to be display at the first position in place of the at least one first object image when the coordinate detector detects a movement of the input object from a first input coordinate to a second input coordinate in the first direction.

3. The image forming apparatus according to claim 2, wherein the controller is configured to control the display to display the at least one first object image such that the at least one first object image disappears from a display region of the display by moving in the first direction and display the at least one third object image such that the at least one third object image appears on the display region by moving in the first direction in response to determining that the at least one third object image is to be displayed at the first position in place of the at least one first object image.

4. The image forming apparatus according to claim 3, wherein the controller is configured to:
    control the display to display one background screen image of a plurality of background screen images, each including the at least one object image, the plurality of background screen images including a first background screen image and a second background screen image that is different from the first background screen image, the first background screen image displaying the at least one first object image, and the second background screen image displaying the at least one third object image;
    determine whether the one background screen image being displayed on the display region of the display is to be switched from the first background screen image to the second background screen image when the coordinate detector detects the movement of the input object,
    control the display to switch the one background screen image being displayed on the display from the first background screen image to the second background screen image when the at least third object image is displayed in place of the at least one first object image by moving the first background screen image in the first direction such that the first background screen image disappears from the display region and by moving the second background screen image in the first direction such that the second background screen image appears on the display region in response to determining that the one background screen image being displayed on the display is to be switched from the first background screen image to the second background screen image; and
    control the display to repeatedly move the at least one third object image in the first direction and the second direction within the second background screen image.

5. The image forming apparatus according to claim 4, wherein the controller is configured to:
    control the display to move the second background screen image when the movement in the first direction over a specific period is continuously repeated a first number of times to switch the one background screen image being displayed from the first background screen image to the second background screen image, and
    control the display to move the at least one third object image when the movement of the at least third object image to the position distant from the first position in the first direction and the position distant from the first position in the second direction over the specific period is continuously repeated a second number of times,
    wherein the second number of times is greater than the first number of times.

6. The image forming apparatus according to claim 4, wherein the controller is configured to:
    control the display to switch the one background screen image by using a plurality of background screen frames, each constituted by at least one of the first background screen image and the second background screen image; and
    control the display to move the at least one object image by using a plurality of object frames, each constituted by the at least one object image, wherein the number of the plurality of object image frames is greater than the number of the plurality of background screen frames.

7. The image forming apparatus according to claim 4, wherein the controller is configured to control the display to move the first background screen image and the second background screen image in the first direction when the first background screen image and the second background screen image follow the movement of the input object in the first direction, wherein the number of the plurality of background screen frames used for switching from the first background screen image to the second background screen image decreases with an increase in a distance of the movement of the input object.

8. The image forming apparatus according to claim 4, wherein the controller is configured to control the display to move the at least one third object image when a distance of the movement of the at least one third object image relative to a reference position, respectively associated with each of the at least one third object image, decreases with an increase in the number of the movement of the respective at least one third object image.

9. The image forming apparatus according to claim 4, wherein the image forming apparatus has a plurality of functions, wherein the at least one object image is plurality of object images, and each of the plurality of functions is assigned to a corresponding one of the plurality of object images, wherein the image forming apparatus further comprises:

at least one sensor to detect a current state of the image forming apparatus; and a function extractor configured to extract a function usable in the image forming apparatus from the plurality of functions based on the detected current state of the image forming apparatus by the at least one sensor, wherein the controller is configured to control the display to repeatedly move the at least one third object image, in the second background screen image, to which is assigned the function extracted by the function extractor.

10. The image forming apparatus according to claim 4, wherein the at least one object image is a plurality of object image, each assigned to a corresponding one of a plurality of users, wherein the image forming apparatus further comprises a user identified unit configured to identify a user using the image forming apparatus among the plurality of users, and wherein the controller is configured to control the display to repeatedly move the at least one third object image, in the second background screen image, to which is assigned the user identified by the user identification unit.

11. The image forming apparatus according to claim 4, wherein the controller is configured to set the second direction to a direction of an initial movement of the at least one third object image, the second direction being the direction opposite the first direction is the direction of the movement of the first background screen image and the second background screen image.

12. The image forming apparatus according to claim 4, wherein the controller is configured to control the display to move the first background screen image and the second background screen image in the first direction when the first background screen image and the second background screen image follow the movement of the input object, and wherein when a distance of the movement of the input object within the display region based on the first input coordinate and the second input coordinate is equal to or less than a predetermined moving distance, the controller moves control the display to move the first background screen image and the second background screen image in the second direction to a position where the first background screen image and the second background screen image are located before the input object touched or approached the display.

13. The image forming apparatus according to claim 12, wherein the controller is configured to control the display to move the first background screen image and the second background screen image in the second direction to the position where the first background screen image and the second background screen image are located before the input object touched or approached the display, the controller sets the first direction to a direction of the initial movement of the at least one object image.

14. A non-transitory storage medium storing a program to be executed by a computer of an image forming apparatus comprising a display configured to display a plurality of images thereon and a coordinate detector configured to detect an input coordinate which is a coordinate indicating a position of an input object having touched or approached the display, the program being designed to cause the computer to:

control the display to display at least one first object image which receives a command for executing a corresponding predefined processing at a first position and at least one second object image which does not receive a command at a second position;

determine, based on a detection of the input coordinate by the coordinate detector, whether at least one third object image, which receives a command for executing a corresponding predefined processing and is different from the at least one first object image, is to be displayed at the first position in place of the at least one first object image;

control the display to display the at least one third object image in place of the at least one first object image at the first position when it is determined that the at least one third object image is to be displayed in place of the at least one first object image;

in response to a detection of a release of the input object by the coordinate detector, control the display to repeatedly move the at least one third object image between a position located distant from the first position in a first direction and a position located distant from the first position in a second direction that is opposite the first direction, and control the display to display, at the second position, the at least one second object image which does not repeatedly move in the first direction and the second direction.

15. A terminal device, comprising:

a display configured to display a plurality of images thereon;

a coordinate detector configured to detect an input coordinate which is a coordinate indicating a position of an input object having touched or approached the display; and a controller configured to:

control the display to display at least one first object image which receives a command for executing a corresponding predefined processing at a first position and at least one second object image which does not receive a command at a second position;

determine, based on a detection of the input coordinate by the coordinate detector, whether at least one third object image, which receives a command for executing a corresponding predefined processing and is different from the at least one first object image, is to be displayed at the first position in place of the at least one first object image;

control the display to display the at least one third object image in place of the at least one first object image at the first position when it is determined that the at least one third object image is to be displayed in place of the at least one first object image;

in response to a detection of a release of the input object by the coordinate detector, control the display to repeatedly move the at least one third object image between a position located distant from the first position in a first direction and a position located distant from the first position in a second direction that is opposite the first direction, and control the display to display, at the second position, the at least one second object image which does not repeatedly move in the first direction and the second direction.

* * * * *